United States Patent [19]

Stapleton

[11] Patent Number: 4,931,956

[45] Date of Patent: Jun. 5, 1990

[54] VIDEO IMAGE CREATION SYSTEMS

[75] Inventor: Alan L. Stapleton, Newbury, Great Britain

[73] Assignee: Quantel Limited, Newbury, United Kingdom

[21] Appl. No.: 851,125

[22] Filed: Apr. 11, 1986

[30] Foreign Application Priority Data

Apr. 13, 1985 [GB] United Kingdom ................. 8509536
Jun. 1, 1985 [GB] United Kingdom ................. 8513874

[51] Int. Cl.[5] ......................... H04N 1/22; G09G 1/16

[52] U.S. Cl. .................................... 364/521; 364/518; 340/703; 340/750

[58] Field of Search ............... 364/521, 518, 424, 522; 340/709, 731, 747, 750, 703

[56] References Cited

U.S. PATENT DOCUMENTS

| | | | |
|---|---|---|---|
| Re. 31,200 | 4/1983 | Sukonick et al. | 340/724 |
| 4,152,766 | 5/1979 | Osofsky et al. | 358/103 |
| 4,288,821 | 9/1981 | Lavallee et al. | 358/280 |
| 4,404,585 | 9/1983 | Hjortzberg | 358/41 |
| 4,424,572 | 1/1984 | Lorig et al. | 340/798 |
| 4,428,065 | 1/1984 | Duvall et al. | 340/798 |
| 4,514,818 | 4/1985 | Walker | 340/110 |
| 4,531,152 | 7/1985 | Lemelson et al. | 358/141 |
| 4,564,915 | 1/1986 | Evans et al. | 364/521 |
| 4,567,515 | 1/1986 | Schumacher | 358/107 |
| 4,633,416 | 12/1986 | Walker | 364/521 |
| 4,672,680 | 6/1987 | Middleton | 364/521 |
| 4,703,318 | 10/1987 | Haggerty | 346/723 |
| 4,721,951 | 1/1988 | Holler | 340/701 |
| 4,725,960 | 2/1988 | Shima et al. | 364/474 |
| 4,751,507 | 6/1988 | Hama et al. | 340/724 |
| 4,757,311 | 7/1988 | Nakamura et al. | 340/731 |

FOREIGN PATENT DOCUMENTS

| | | | |
|---|---|---|---|
| 1182926 | 2/1985 | Canada . | |
| 60-05334 | 1/1985 | Japan | 340/716 |

OTHER PUBLICATIONS

Lax, L. et al., "NAPLPS Standard Graphics and the Microcomputer", *Byte,* Jul. 1983, pp. 82–92.

*Primary Examiner*—Gary V. Harkcom
*Assistant Examiner*—Phu K. Nguyen
*Attorney, Agent, or Firm*—Cooper & Dunham

[57] ABSTRACT

A system for creating high resolution video images for later use in printing or the like. The operator draws with a stylus on a touch tablet (28) and video signals are processed to produce a high resolution image corresponding to what is drawn, the signals being stored in a high resolution store (25). While the processing of the signals progresses certain signals are copied to a lower resolution viewing store (26) and these signals read to a display (27) where the image can be viewed by the operator. In one example the store (25) is notionally divided into areas and when the signals representing a stroke drawn by the operator are present in an area the whole area is copied to the viewing store. Typically about four areas need to be copied in a frame period so the stroke drawn by the operator can be seen as he is drawing it. The image on display (27) may be a low resolution version of the whole image or a high resolution version of part of the image.

20 Claims, 2 Drawing Sheets

VIDEO IMAGE CREATION SYSTEMS

FIELD OF THE INVENTION

This invention relates to video image creation systems particularly to those for creating images at high resolution.

BACKGROUND OF THE INVENTION

The system described in co-pending UK Pat. No. 2165728, which corresponds to U.S. application Ser. No. 771,245 now U. S. Pat. No. 4,775,858, (incorporated herein by reference) and shown in FIG. 1 is capable of producing a high resolution image whilst simultaneously allowing the operator to view a low resolution version of the image on a color television monitor. The operator creates the image by 'drawing' on touch tablet 2 with a stylus and choosing a color and notional implement using keyboard 1. The touch tablet produces signals representing the co-ordinates of the point of contact between the touch tablet and the stylus and these signals are translated to frame store addresses by computer 3. For each picture point designated luminance and chrominance video signals for that and several neighbouring picture points (called a patch) are processed. The number of picture points in each patch and the distribution of chrominance or luminance signals for these points is pre-determined for each type of notional implement which may be chosen. On chosing an implement using the key board signals representing the distribution are stored on the shape RAM 4. Video signals representing the chosen color are stored at corresponding picture points in the patch RAM 5. To obtain the image, each picture point video signal in a patch from 5 is processed in the processor 6 with the signal from that address in the frame store 7, the distribution signal from RAM 4 being used to determine the proportions of new and stored information which will make up the processed signal. The contents of the frame store 7 are read periodically to a television display system 8, to produce a picture of the image. The frame store has sufficient storage locations to store signals for each image point in a picture conforming to TV standards in resolution. The distribution is provided to simulate the effect of the implement on paper. This type of processing is described in our co-pending UK Pat. No. 2089625, which corresponds to U.S. Pat. No. 4,514, 818 (incorporated herein by reference).

The system for producing high resolution images shown in FIG. 1 is divided into two parts, one working at high resolution and one at lower resolution. The processors 6 and 18 in both parts are the same and operate at a rate of 700,000 pixels per second and this enables the low resolution part to operate so that the image appears on the screen of display 8 as the operator draws it which is usually a conventional color T.V. monitor. The frame store 19 in the high resolution part is typically capable of storing 2560 by 2048 picture points which is approximately thirteen times that of the frame store in the low resolution part. The number of picture points in the frame store 19 is much larger than in frame store 7 and each patch associated with a designated picture point will include many more picture points and so there will be more picture points to be processed for each designated address and the processing tends to lag behind that in the low resolution part. The processor is unable to process the signals at the rate required to keep up with the command signals from computer 3 for all rates of 'drawing' by the artist and so a buffer store 15 is provided to store these signals.

The signals from keyboard 1 and touch tablet 2 are received by the computer 3 where they are translated to give addresses, patch size and distribution signals to be used in the processing. In the high resolution part of the system the number of picture points in a patch will be greater than in the low resolution part but the shape of the distribution will be the same. The signals from the computer are output to address generator 9, which generates the patch of addresses as required by frame store 7, patch RAM 5, shape RAM 4 and buffer store 15. The patch RAM 5 produces the picture point video signals for the addresses generated by address generator 9. The picture point video signals from patch RAM 5 are processed with corresponding picture point signals from frame store 7 to give a picture on display 8 in approximately real time, i.e. as the operator draws a line it will appear on the screen blending with any picture information previously in the store 7 for the same addresses. The image produced on the screens will closely simulate the effects expected if the operator were using real painting equipment such as paper and pens. Unless the processing in the high resolution part of the system is keeping up with the input commands these will be held in the buffer store 15 until the processor 18 is able to process the patch of picture point signals surrounding the designated signal. However, the operator is able to continue creating the image in his own time, since he is able to observe the effect he is creating by observing the low resolution display at 8, although he can not observe the high definition picture whilst it is in the course of processing.

The generation of the high resolution video signals is effected by means of address generator 20, shape RAM 16 and patch RAM 17 shown as components Y, I, Q sections 17A, 17B, 17C. The picture point signals are applied to processor 18 (comprising section A, B and C), the results are applied to store sections 19A, 19B and 19C, the final picture is applied from 19 for reproduction in a printing scanner 21 or by other graphic process.

As the production of the image in real time progresses the generation of the high resolution video image may lag behind although if the operator is working at a slow rate the processing may catch up. The speed of processing required to keep up with the operator depends on the implement chosen, therefore patch size, and how quickly the operator is moving the stylus across the touch tablet. The final image from scanner 21 consists of an 8 bit color video image with a resolution of 2560 picture points by 2048 lines.

The system described depends for its operation on the fact the operator normally operates intermittently and may pause between strokes to examine the effect on the picture being created. Such pauses allow the high resolution processor 18 to catch up on the operator, so that the amount of buffer storage required may be held to reasonable limits. However, if the high resolution image processing lags a long way behind the real time processing then the buffer store 15 may become full and the system will no longer accept information from the touch tablet or computer. This situation may occur for example if the operator selects a mode of operation in which painting with an air brush is simulated, which may result in large areas of the picture being "painted" rapidly. If the buffer 15 becomes full the operator has to cease painting until the high resolution part of the system has processed enough information for the buffer store to be able to accept more.

SUMMARY OF THE INVENTION

The object of the invention is to provide a high resolution video image creation system which is capable of processing incoming information at the rate at which it is received. Another object is to provide a high resolution video image creation system in which the image can be monitored as it is created even when the monitor cannot provide the full resolution of the image.

According to the present invention there is provided a video image creation system comprising operator controlled means for designating points on a image being created, processing means responsive to said operator controlled means for producing high definition signals representing picture points on said image, storage means up-datable with said picture point signals to provide a representation of said image, said storage means having sufficient storage locations for full resolution, a monitor capable of reproducing images of lower definition, and means for deriving signals from said storage means of reduced numbers per frame compared with said high resolution signals and for applying said signals for reproduction by said monitor to enable the operator to monitor the image being created.

Preferably, control means are provided whereby the signals derived from the storage means may be reduced by filtering to reduce the definition compared with said high definition signals.

Alternatively, the derived signals may be reduced by deriving them from a selected "area" of the storage means so that only part of the image being created is displayed on the monitor.

Desirably the operator can select one or the other mode of operation, depending on his mode of working at a particular time. For example, if larger areas of the picture are being worked over at one time, for example to apply a "wash" or "spray" it would be desirable for the operator to be able to observe the full image on the monitor, though it be at a lower definition than the final image would be. If on the other hand, the operator is applying detail to only a small part of the image, it would be preferable for the operator to be able to observe only the respective part of the image, but at full definition.

According, also, to the invention there is provided a video image creation system comprising;

input means designating the address of a picture point, selector means for selecting color component signals pertaining to said picture point and a number of adjacent picture points, frame store means for storing processed picture point signals, said frame store means being capable of storing picture point signals representing a high resolution image, processing means for processing said color component signals received from said selector means with stored picture point signals from said frame store means, said processor means being capable of operating at the rate at which said color component signals are received, second frame store means for storing picture point signals representing a picture of lower resolution, and means for selectively transferring a number of said processed signals from said first frame store means to said second frame store means, and displaying means for displaying signals from said second frame store means.

One embodiment of the invention will now be described with reference to the accompanying drawings:

DETAILED DESCRIPTION

Figure 1:
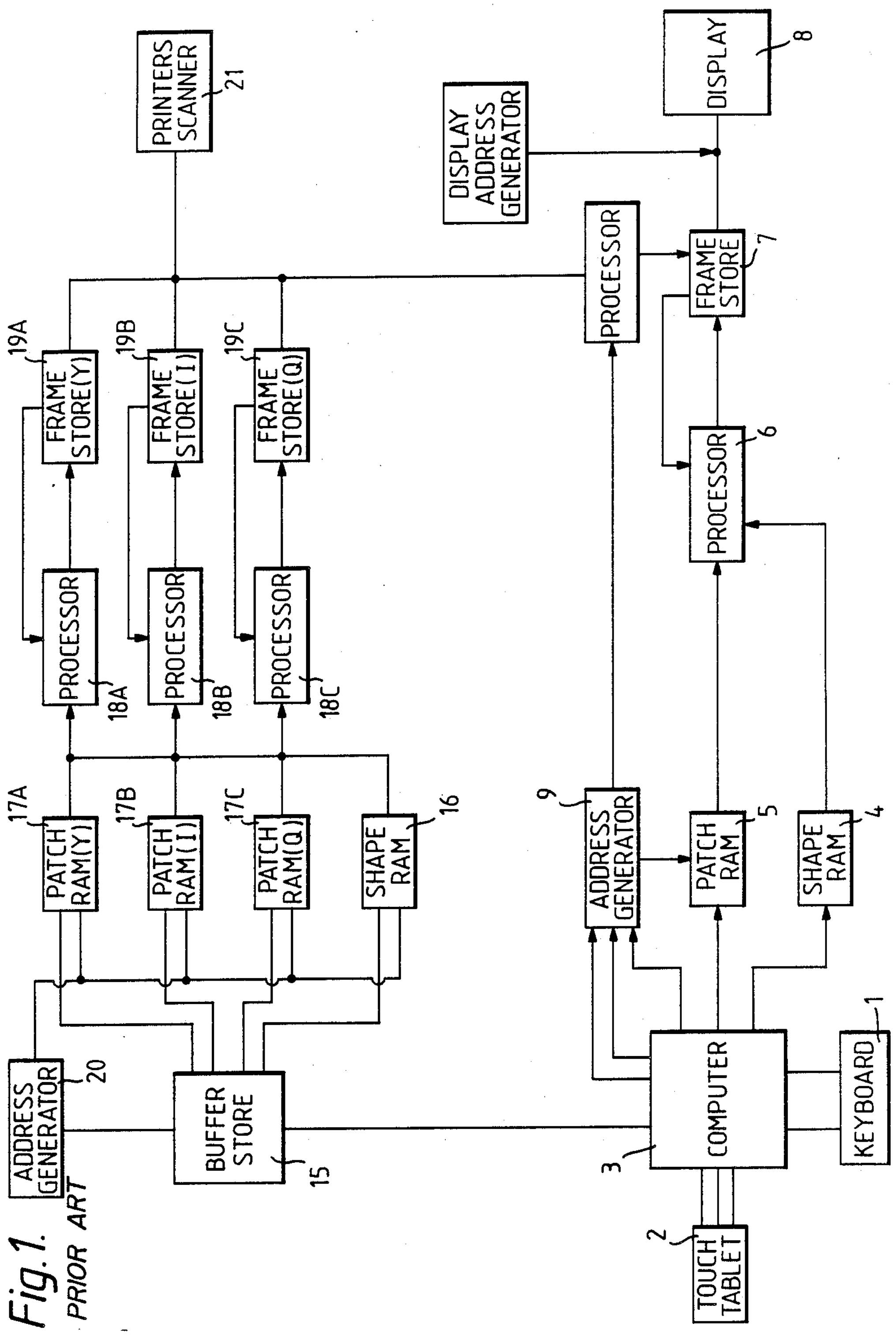
Fig.1. PRIOR ART
FIG. 1 shows the prior art system.
Figure 2:
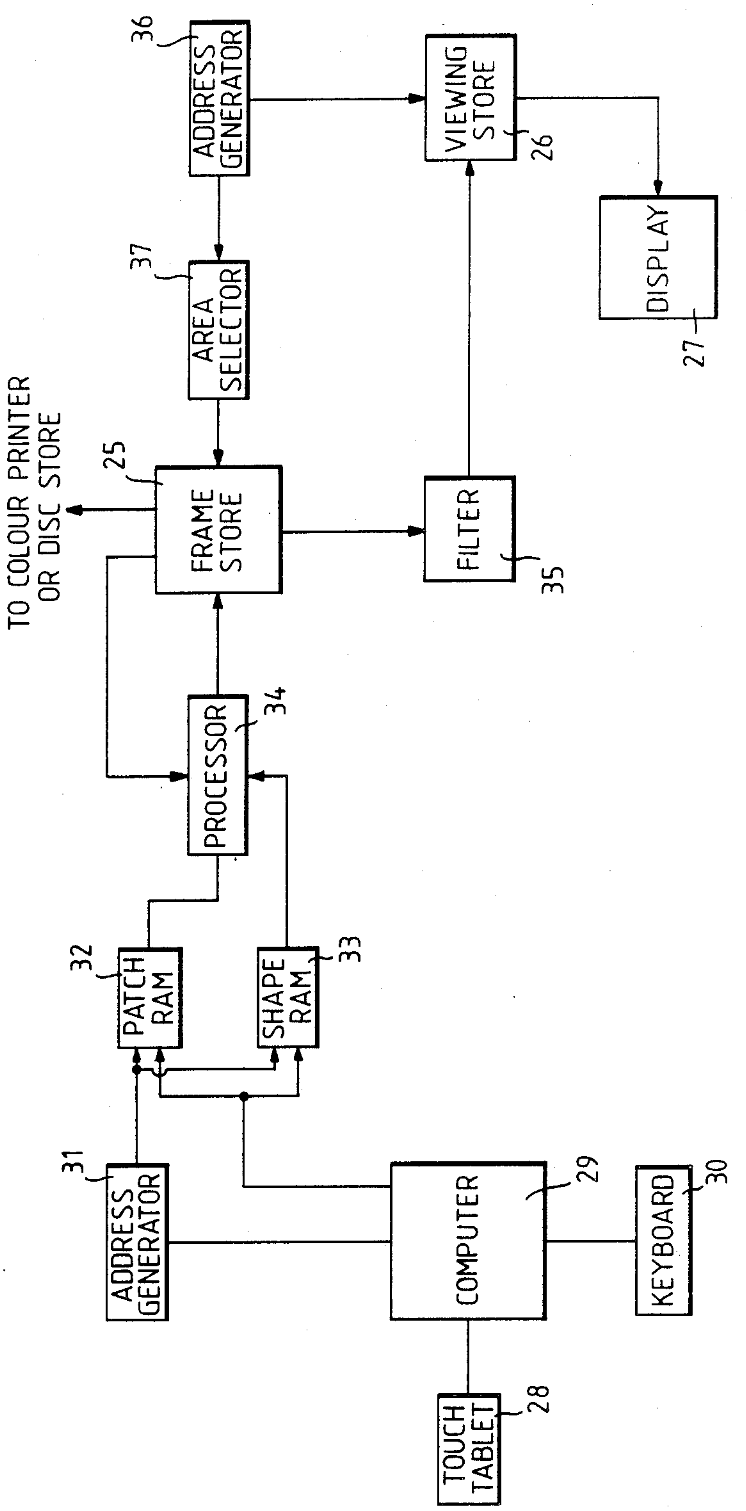
FIG. 2 shows one embodiment of the invention.

The apparatus in FIG. 2 is one example of the invention and shares some common features with the high resolution part of the prior image creation system namely touch tablet 28, computer 29, keyboard 30, address generator 31, patch RAM 32, shape RAM 33, and processor 34. The high resolution image in frame store 25 is produced in essentially the same manner as in the prior art but the circuits are designed so that the processing can be done at a much higher rate. Each picture point signal is still processed individually with the signal stored at that address in the frame store 25 but the processing can now be carried out at speeds of up to 9 million picture points per second and so the incoming information may be processed even at the fastest rate at which it is likely to be received. The lower resolution image that appears on display 27 is built up of picture point signals from frame store 25. The image that will be viewed on the display is produced in approximately real time and may consist of a low resolution version of the whole image or of parts of that image at differing resolution dependent on the size of that part.

The system operates with 8 bit digital video signals and may use RGB or YUV components. In FIG. 2 only the luminance path for a YUV system is shown. The touch tablet/stylus combination 28 is capable of generating position signals with an accuracy adequate for the high resolution system and if necessary the computer 29 may interpolate between such position signals to produce the required number of "patches" per line for the high definition picture.

As in the previous systems of UK Pat. Applications No. 2165728 and UK Pat. No. 2089625 which corresponds to U.S. Pat No. 4,514,818 the operator inputs signals using touch tablet 28 and keyboard 30 via computer 29. The computer accesses the patch of picture point signals to be processed, from patch RAM 32 and the required distribution from shape RAM 33. The distribution is a set of signals representing a value K which determines the proportions of the new and stored signals which are to make up the processed picture point signal. Each picture point signal in patch RAM 32 is processed with the signal from that address in frame store 25. Frame store 25 is typically of dimensions 2560 and 2048 picture points and each patch say of size 30×30 picture points for a notional brush.

To give an order of magnitude example of the speed at which the processor needs to operate in order to keep up with the operator, consider the case where the operator does a stroke across the touch tablet. If the stroke takes half a second then the line crosses addresses at a rate of 5000 picture points per second. Assume each patch is 1000 pixels then the processing rate required is, very approximately 5000×1000 picture points per second, or about five million picture points. It is obvious that this is within the rate of nine million per second of which the processor is capable, and even allowing for greater patch size the processor should be able to keep up. If the patch size, i.e. brush size, is greater, then the operator would expect to go more slowly as this is what happens when using a real large brush The image to be viewed by the operator on color display 27 is taken from the viewing store 26 which is of the usual size for television and which receives picture point signals from frame store 25. There are two ways in which the picture point signals may be read from the frame store 25, reduced and written into viewing store 26.

One way is to read only from areas of the frame store 25 in which 'drawing' is taken place at the particular time, the reading being alternated with processing of the picture points in the processor 34, affected by the drawing. On this mode of operation the areas in 25 from which reading occurs are controlled by the address generator 36 and area selector 37 in a similar way for example as by address generator 31 and patch RAM 32. The picture point video signals read from 25 (the reading being non-destructive) are read into locations in the viewing store 26 also determined by the address generator 36, so that when this store is read in TV raster sequence, the picture point video signals in question give rise to video effects in the correct positions. The signals in passing from store 25 to store 26 pass through an adjustable filter 35 which is rendered transparent if no reduction in resolution takes place as between store 25 and store 26. If no reduction occurs, the display of the selected areas on the screen of 27 will be enlarged (relative to the frame) compared with the image stored in store 25. On the other hand, the signals may be reduced by the filter 35 to reduce the resolution to correspond the area occupied on the display 27 by the part of the image in question. If the resolution is reduced by the filter 35 to correspond to the number of picture points which can be present in the display 27, the whole picture as it is created by the artist will be visible on the display, although updating of video signals in the store 26 will be confined, at any particular time, to those lying in the area in which drawing is occurring. The picture points copied from the store 25 to the viewing store 26 need not, in this mode of operation, be those just processed. Some lag may occur, but in general the transfer will take place soon after 'drawing' occurs.

The viewing store 26 is capable of reading out at a rate of 72 million picture point a second and is notionally divided into areas of picture points approximately 1/16 of the frame store size. If the whole of frame store 25 was read at the rate of reading to viewing store 26 the processing would lag behind the reading but during each frame period the operator normally draws a line which will only appear in a maximum of four of these areas. For each area that includes a portion of the stroke drawn by the operator the read-modify-write processing described above is completed for those picture points making up the stroke and then all the picture points in that patch quarter are written in the viewing store 26 under the control of area selector 37. If the operator is drawing at normal speed a maximum of a quarter of the frame store 25 will have to be copied to the viewing store and this can be achieved in a frame period.

In an alternative mode of operation the reading for copying to the frame store 26 is interleaved in pixel time with the read-modify-write processing. If the selected addresses to be displayed are such that all picture points from a part area only of the store 25 need be written in the store 26, then the picture in that area can be displayed at full resolution. If, however, the address selection is such as to transfer video signals from the whole area of store 25 to the store 26, data reduction by the filter 35 is necessary to enable the store 26 to accommodate the video signals from the whole area. Thus, when the image is displayed its resolution is reduced.

As stated, before being written into the viewing store 26 the picture points pass through filter 35 which has several modes of operations. If the area selected by the selector 37 is such that the number of picture point signals read from frame store 25 is too large for the viewing store or if the whole of the frame store 25 is selected the filter acts to reduce the number by either an averaging over patches of 16 or some other number of picture points or simply by allowing, say, only one in a given number of picture points to pass. Alternatively the filter may interpolate or replicate picture points if there is enlargement between 25 and 26. The address generator 36 determines the number and location of picture points read from frame store 25 so that whichever part of the image is desired to be viewed can be seen. This may consist of anything from a small patch surrounding the part where the operator is working to a low resolution version of the whole image. As well as providing a low resolution version for display frame store 25 may be read onto a disc store or straight to color printing scanners so that the high resolution image may be seen.

The speed of processing for this type of system has been increased by the use of a type of RAM in the frame store which allows greater speeds of access and the required mode of addressing. The RAMs used are IMS2600 and HM50257 and these allow for four picture points to be stored in consecutive locations of one RAM and accessed quickly.

I claim:

1. A video image creation system comprising:
operator controlled means for designating points in an image being created;
processing means responsive to said operator controlled means for producing high definition signals representing picture points in said image;
storage means for storing said high definition signals representing picture points in said image;
said storage means comprising sufficient storage locations to store signals representing the image at full resolution;
monitor means;
a viewing store for storing images with a reduced number of picture points compared with the image stored in said storage means;
means for addressing said viewing store to provide a video signal to said monitor means; and
means for selectively updating said viewing store by deriving a reduced number of signals from said storage means in real time relative to designation of points by said operator controlled means.

2. A video image creation system as in claim 1 wherein said means for deriving signals from said storage means includes filter means for reducing the resolution of the image, to thereby cause the monitor to display in real time an image at a lower resolution as compared with the resolution of the image in the storage means.

3. A video image creation system as in claim 1 wherein said means for deriving a reduced number of signals from said storage means includes means for reading signals representing picture points from only part of said storage means, and means for applying the last recited signals to said viewing store to reproduce only part of the image being created at the same resolution as in said storage means.

4. A video image creation as claimed in claim 1 wherein said means for deriving a reduced number of signals from said storage means includes:

in one mode means for filtering said signals prior to application to said viewing store to convert them to signals representing the image at a lower resolution;

in a second mode means for deriving said signals from only part of said storage means;

means for selecting said first mode to reproduce the image being created on the monitor means at a lower resolution as compared with the image in the storage means; and means for selecting said second mode to reproduce on the monitor means a part of said image being created at the same high resolution as the image in the storage means.

5. A video image creation system as in claim 1 wherein said operator controlled means for designating points comprises a touch tablet and stylus.

6. A video image creation system as in claim 1 further comprising:

means for receiving distribution signals representing the distribution power of an implement; and means for providing incoming video signals;

wherein said processing means further includes means for combining said incoming video signals with corresponding signals from said storage means in response to said distribution signals and means for storing said combined signals in said storage means.

7. A video image creation system as in claim 1 further comprising means for transforming said signals from said storage means to signals for driving a color printer to allow the high resolution image created to be reproduced by said color printer.

8. A video image creation system comprising:

input means for designating the address of a picture point in an image;

selector means for selecting color component signals pertaining to said picture point and a number of adjacent picture points in the image;

first frame store means for storing processed picture point signals, said first frame store means being capable of storing picture point signals representing said image at a high resolution;

processing means for processing said color component signals received from said selector means with stored picture point signals from said first frame store means, said processing means being capable of operating at the rate at which color component signals are received;

second frame store means for storing a lesser number of picture point signals representing an image than said first frame store means;

means for selectively transferring a number of said processed signals from said first frame store means to said second frame store means; and display means for displaying signals from said second frame store means.

9. A video image creation system as in claim 8 further comprising:

means for notionally dividing said first frame store means into a plurality of areas, each area containing storage locations for picture point signals having respective addresses;

area selector means for selecting one or more of said areas, said area selector means including means responsive to said input means to select areas containing storage locations having designated addresses;

means for processing designated picture points in the selected areas and;

said means for selectively transferring a number of said processed signals from said first frame store means to said second frame store means further includes means for transferring the picture point signals for all the picture points in the selected area to said second frame store means.

10. A system as in claim 9 wherein said means for selectively transferring includes filter means to reduce the number of picture points written into said second frame store means, to thereby store in the second storage means an image having a lower resolution compared with that stored in the first storage means.

11. A system as in claim 8 wherein said means for selectively transferring a number of said processed signals from said first frame store means to said second frame store means includes filter means for filtering the picture point signals prior to storage in said second frame store means to store therein signals representing the image being created at lower resolution than those stored in said first frame store means.

12. A system as in claim 8 wherein said means for selectively transferring said signals includes means for reading from only a part of said first frame store means to said second frame store means, to thereby store in the second storage means signals representing a part of the image being created at high resolution.

13. A method of video image creation comprising:

designating points on an image to be created;

providing and processing video signals corresponding to designated points to produce processed high resolution signals representing the image to be created;

storing said signals in a first frame store with a large number of storage locations;

selectively transferring signals from said frame store to a second frame store which has less storage locations than the first frame store;

and displaying the image represented by the signals stored in the second frame store in real time relative to said designating of points on an image to be created.

14. A method as in claim 13 further comprising:

notionally dividing the first frame store into a number of areas; and selecting areas containing processed signals and reading all of the processed signals in the selected areas to transfer to the second frame store.

15. A method as in claim 13 wherein said transferring of signals is temporally interleaved with said processing of video signals.

16. A system comprising:

a touch tablet and a stylus for designating picture points in an image and a keyboard for designating a notional drafting implement identifying a patch of picture points associated with a picture point designated by the touch tablet and stylus and for designating a selected distribution of characteristics of the picture points in the patch;

a high resolution frame store having storage locations for picture point signals representing picture points which are identified by respective addresses in the high resolution store and are sufficient in number to store picture point signals representing all of the picture points of a high resolution image;

a computer circuit responsive to designation of picture points by the touch tablet and stylus and to designation of an implement and of a distribution by the keyboard, to produce addresses of selected storage locations in the high resolution frame store and selected patch size and patch distribution signals, and to use the last recited addresses and signals to generate updating picture point signals for selected picture points of the image in the high resolution store;

a processor responsive to updating picture point signals from the computer and to picture point signals read out of selected storage locations in the high resolution frame store to process the last recited signals from the computer and from the high resolution frame store and to thereby produce processed picture point signals, and to store processed picture point signals in selected locations in the high resolution frame store;

a viewing frame store having storage locations for picture point signals representing picture points which are identified by respective addresses in the viewing store and are substantially less in number than those in the high resolution store, and therefore are sufficient only to store an image made up of a substantially lesser number of picture points;

a filter connected between the high resolution frame store and the viewing frame store for selectively transferring picture point signals from the high resolution store to the viewing store in a selected one of (i) a first mode, in which only the picture point signals from a selected area of the high resolution store are transferred to the viewing store, to form therein a high resolution image of only a part of the image stored in the high resolution store, and (ii) a second mode, in which the filter forms a lower resolution version of the entire image stored in the high resolution store and transfers the lower resolution image to the viewing store; and a monitor and means for selectively displaying thereon the image stored in the viewing store in real time relative to the operation of said touch tablet and stylus.

17. A system as in claim 16 in which the picture points in said patch which are associated with a designated picture point are spatially adjacent to the designated point.

18. A system as in claim 16 in which said processed picture point signals which the processor produces are the result of combining updating signals and signals from storage locations in the high resolution store which are for picture points identified by corresponding addresses.

19. A system as in claim 18 in which each of said processed signals is the result of combining a selected portion of an updating signal for a picture point identified by a selected address with a selected portion of a picture point signal stored in the same address in the high resolution store.

20. A system as in claim 16 including a high resolution printer coupled to said high resolution store to print at least a selected part of the high resolution image stored in the high resolution store.

* * * * *